…

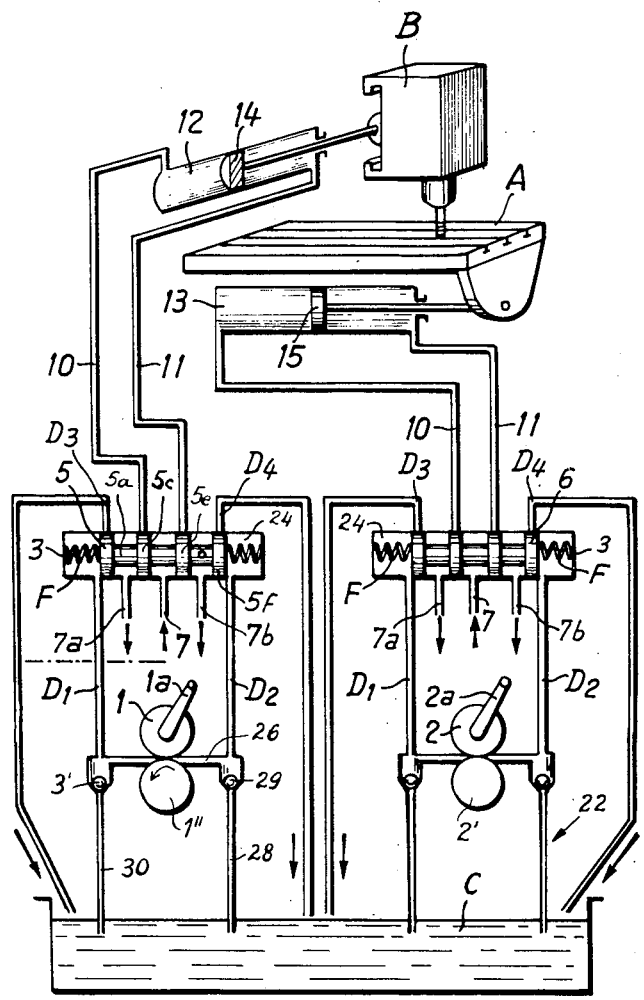
INVENTOR.
ROLF GLASER

United States Patent Office 3,154,922
Patented Nov. 3, 1964

3,154,922
HYDRAULIC CONTROL ARRANGEMENT FOR MOVING ELEMENTS OF A MACHINE TOOL
Rolf Glaser, Rorschach, Switzerland, assignor to Starrfrasmaschinen AG., Rorschacherberg, Switzerland
Continuation of abandoned application Ser. No. 626,371, Dec. 5, 1956. This application Feb. 8, 1962, Ser. No. 171,916
6 Claims. (Cl. 60—52)

This invention relates in general to devices for controlling the relative movement of various elements and in particular to a new and useful fluid actuated control for effecting the effortless shifting of a movable element such as a machine part by means of a rotatable hand crank.

This invention is a continuation of application Serial No. 626,371, filed December 5, 1956, now abandoned, for "Hydraulic Control Arrangement for Moving Elements of a Machine Tool," by the present applicant.

The present invention finds particular application in connection with a machine which includes large size machine elements which are made relatively displaceable. With machines of this character it is preferable that the machine element be shifted by means of a hydraulic or an electrical system which requires little actuating force on the part of the operator. With prior art constructions of this type, however, it has been found that there is a tendency for the operator to encounter great difficulty in effecting movement of a machine element in precise predetermined amounts by means of the automatic control systems which are in use. The push button and lever type of control which are employed for operating such automatic system is somewhat unfamiliar to the operator and the characteristics of such arrangements are such that accurate control of the feed rate or relative movement of the various machine parts can only be obtained with conscious effort and extreme difficulty. Since the operator's attention is entirely absorbed by the machine operation itself, faulty control is possible and very frequently valuable work pieces are spoiled.

In accordance with the present invention there is provided a simple fluid control for shifting one machine element in respect to another in a selected direction and in a given amount in accordance with the direction of rotation and the amount of rotation of a hand crank which is connected in the control system. The invention includes a piston and cylinder combination in which the piston and cylinder are displaced relatively for the purposes of shifting a movable element which is secured to one of these elements. The invention includes a fluid pressure source for operating the control which is connected to the piston and cylinder combination by a control valve having means for regulating the side of the cylinder to which the fluid pressure is admitted for controlling the relative displacement of the piston and cylinder.

A feature of the invention is that the operation of the valve control is effected by means of a rotatable hand crank which in the preferred embodiment includes a connection to the control valve to shift an element therein for the control of fluid pressure to the piston and cylinder combination. The arrangement is such that the controlled movement of the movable element is carried out in accordance with the direction and amount of rotation of the rotatable hand crank in a manner similar to the amount of movement which would be effected to the movable element if the hand crank were connected directly to an advancing screw for moving this element, for example.

Accordingly it is an object of this invention to provide an improved fluid actuated control for displacing relatively movable parts.

A further object of the invention is to provide an improved hand crank operated fluid actuated control for displacing relatively movable parts.

A further object of the invention is to provide a fluid actuated control for displacing relatively movable parts such as machine elements, which includes a control valve for regulating the fluid pressure to a displaceable piston and cylinder combination which is connected to the movable element, and a hand crank connected to the control valve and effective to displace an element of the control valve in a manner to effect displacement of the movable element by actuating the control valve and the piston and cylinder combination in accordance with the rotation of the hand crank.

A further object of the invention is to provide a fluid control system for displacing an element of a machine which includes means for pressurizing a fluid actuated piston and cylinder combination which is connected to the movable element in a manner so that relative displacement of the piston and the cylinder effects movement of the element, and a control valve connected to a fluid pressure source and connected to the piston and cylinder combinations which control valve includes a control element which is movable for the purpose of varying the relative movement of the piston and cylinder under the control of a pump having a hand crank for effecting rotation thereof.

A further object of the invention is to provide a fluid control system which is simple in design, rugged in construction, and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

The only figure in the case is a diagrammatic view of a duplicating milling machine incorporating a fluid control system for moving the parts thereof constructed in accordance with the invention.

Referring to the drawing in particular, the invention embodied therein includes a machine table A which is displaceable in a longitudinal direction and a spindle housing B which carries a slide which is displaceable in a transverse direction. In accordance with the invention, these elements may be relatively adjusted by operating the corresponding hand cranks 1a and 2a of pump units generally designated 1 and 2, respectively, which are associated with substantially identical fluid control systems generally designated 20 and 22, respectively. The fluid system 20 serves for the control of fluid pressure to a working cylinder 12 in which there is provided a displaceable working piston 14 which is connected to the slide carried by the member B. The fluid system 22 is provided for the purpose of controlling the fluid pressure to a working cylinder 13 having a displaceable working piston 15 therein which is connected to the table A for effecting the movement thereof. Each of the fluid systems 20 and 22 is substantially identical and therefore only a single system 20 will be described herein.

In accordance with the invention, to change the relative positions of the piston 14 and the cylinder 12 for the purposes of controlling the movement of the element carried by the housing B, there is provided a control valve generally designated 24 which regulates the quantity of fluid under pressure which may be delivered from a fluid pressure supply line 7 to a control valve housing and to either conduit 10 or 11 serving opposite sides of the cylinder 12.

In the central neutral setting of the control valve 24 an internal valve spool or valve control element generally designated 5 is arranged to prevent flow from the pressure source 7 through either conduit 10 or 11. The valve control element 5 includes a central spindle portion 5a and axially spaced large diameter control piston portions 5b, 5c, 5e and 5f. The two central piston portions 5c and 5e are indicated in the drawing in a position closing the connection between the fluid pressure conduit 7 and either of the conduits 10 or 11. If the valve control element 5 is displaced to the left, for example, fluid under pressure will be directed from the conduit 7 through the conduit 10 to pressurize the left hand portion of the working cylinder 12. If the valve control element 5 is moved to the right, then the piston portion 5e is moved away from the conduit 11 connection to the control valve 24 and pressure from the conduit 7 is admitted to the conduit 11 on the opposite side of the working cylinder 12.

The control valve 24 operates in association with a liquid reservoir C in the embodiment illustrated. Drain-off or return flow conduits 7a and 7b extend to reservoir C from the control valve housing at connection locations between piston elements 5b and 5c and 5e and 5f, respectively, when the control valve element 5 is in a neutral position. Return flow is from the control valve housing 24 in the direction of the arrows to the reservoir C.

The control valve element 5 is normally biased by springs F/F into a central neutral position, as indicated, in each of the control valve housings 3, 3. In this neutral position, neither of the conduits 10 or 11 is pressurized.

In order to pressurize either of the conduits 10 or 11 for the purpose of shifting the piston 14 in the cylinder 12, or the piston 15 in the cylinder 13 there are provided the hand pumps 1 and 2, respectively, with the related fluid conduit connections. The pump 1 advantageously includes rotary gear elements 1' and 1" which rotate in a conduit 26. In accordance with the direction of rotation of the hand crank 1a, fluid is either directed to the left of the conduit 26 and up conduit $D_1$ and into the control valve housing 3 at the left end thereof, or to the right in conduit 26 and up conduit $D_2$ to the right hand side of the control valve, housing 3. When the hand crank 1a is rotated counterclockwise suction is obtained through a conduit 28 disposed in the reservoir C to effect lifting of a ball check 29 for flow to the conduit $D_1$. When clockwise rotation of the hand crank 1a is made, fluid is picked up from a suction line 30 to lift a ball check 31 and effect flow upwardly in the conduit $D_2$. Ball check 31 closes when the flow is up conduit $D_1$ and ball check 29 closes when the flow is up conduit $D_2$.

When the hand crank 1a is rotated to effect pumping of liquid upwardly through the conduit $D_1$ and to the left hand side of the housing 3, the control element 5 is displaced to the right against the force of the right hand spring F. This displaces piston 5b away from the covering of a conduit $D_3$ which permits draining of the fluid from the pump back to the reservoir C. The conduit $D_3$ is indicated in a shortened condition but in reality it extends completely back to the reservoir C. At the same time the piston portion 5f covers the conduit $D_2$ so that fluid may be circulated from the reservoir C upwardly through the conduit $D_1$ and returned through conduit $D_3$ to the reservoir C.

With the control valve 5, displaced to the right the piston portion 5c uncovers the conduit 10 and permits it to communicate with the return or drain off conduit 7a so that the pressure on the left hand side of the piston 14 is materially reduced. At the same time pressure from the conduit 7 communicates with the conduit 11 to force the piston to the left to effect a similar movement of the element held on spindle housing B to which it is secured.

When the hand crank 1a is rotated clockwise fluid is forced upwardly through conduit $D_2$ to displace the valve control element 5 to the left and communicate the return conduit $D_4$ with the line $D_2$ so that liquid is circulated from the reservoir C through the conduit $D_2$ back through the conduit $D_4$ to the reservoir. Conduit 11 is therefore communicated with the return conduit 7b after the piston portion 5e is moved to the left thereof. The pressure conduit 7 is communicated with the conduit 10 and the left side of the piston is pressurized moving the piston to the right to effect a similar movement of the element to which it is secured.

Thus it can be seen that fluid pressure is applied from the pressure line or conduit 7 to a selected side of an associated working cylinder 12 or 13 in order to effect controlled movement of the machine element. When the hand cranks 1a and 2a are not rotated control valve 24 is such that the parts will remain stationary. Rotation of the cranks 1a and 2a in either direction will, however, cause displacement of the pistons 14 and 15 in an amount in dependence upon the direction of rotation of the hand cranks and the duration of such rotation. The invention therefore provides a simple means for controlling the relative displacement of machine parts by the rotation of a hand crank which effects the movement of a pump in a fluid control system.

While a specific embodiment of the invention has been shown and described in detail to illustrate the application of the inventive principles, it will be understood that the invention may be embodied otherwise without departing from such principles.

What is claimed is:

1. A fluid actuated control for displacing parts such as machine elements of a machine tool comprising a working cylinder, a piston displaceable in said working cylinder operably connectable to a machine element to shift the aforesaid element in accordance with displacement of said piston, and means for applying a first fluid under pressure to said working cylinder selectively to alternate sides of said piston to displace said piston to shift the machine element, including a control element having a sliding control valve therein for controlling the direction of the first fluid to the respective sides of said working cylinder, and a rotatable hand crank operated fluid pump connected to said control element and rotatable in one direction for supplying a second fluid to shift the control valve to cause said first fluid to be directed to one side of said piston in said working cylinder and to move said piston and machine element in one direction, said hand operated fluid pump being rotatable in an opposite direction for supplying said second fluid to shift said control valve to cause said first fluid to be directed to the other side of said piston to move said piston and machine element in an oposite direction, drain-off lines provided for said control element, said drain-off lines delivering the first fluid returned from said working cylinder directly back to a reservoir, respective pipe means communicating said hand crank operated fluid pump with said control element for selectively delivering second fluid to opposite ends of said control element, and respective return pipe line means for said second fluid operably connected with said control element and cooperating with said respective pipe means, each of said respective return pipe line means being in fluid flow communication with its associated pipe means during such time as second fluid is flowing through said associated pipe means for displacing said control valve.

2. A fluid actuated control for displacing parts such as machine elements of a machine tool according to claim 1 wherein said means for applying a first fluid under pressure to said working cylinder further includes means to direct said first fluid under pressure to a central portion of said control element, said sliding control valve in said control element including portions preventing communication between the first fluid under pressure and said working cylinder.

3. A fluid actuated control according to claim 2 including a first conduit connected to one side of said working cylinder and to said control element at a spaced location from the fluid pressure connection thereto, and a second conduit connected to the opposite side of said working cylinder and connected to said control element at a location spaced from the fluid pressure connection thereto in an opposite direction from said first conduit, said sliding control valve including means covering said first and second conduits at the connection to said control element when in a neutral position but being displaceable in one direction to communicate said first conduit with said control element and said fluid pressure means, and displaceable in an opposite direction to communicate said second conduit with said control element and said fluid pressure means.

4. A fluid actuated control according to claim 3 including means to bias said control valve into a neutral position.

5. A fluid actuated control for displacing parts such as machine elements of a machine tool comprising a working cylinder, a piston displaceable in said working cylinder connectable to a machine element to shift the element in accordance with displacement of said piston, a slide valve housing having two ends, first and second conduits for a first fluid under pressure connected to respective opposite ends of said working cylinder and to said slide valve housing at spaced locations adjacent a central portion thereof, first and second drain-off lines connected to said slide valve housing at spaced locations on respective sides of said first and second conduit connections in directions toward the respective housing ends, first and second return flow pipe lines connected to said slide valve housing at spaced locations on respective sides of said first and second drain-off lines in directions toward the respective housing ends, a fluid pump having a rotatable hand crank to circulate a second fluid under lower pressure than said first fluid, first and second pressure lines extending from opposite sides of said pump to said slide valve housing at spaced locations on respective sides of said first and second return flow pipe lines in directions toward the respective ends of said housing, fluid suction means connected to said pump, said crank being rotatable in one direction to take said second fluid from said fluid suction means and direct it to said first pressure line and being rotatable in another direction to take said second fluid from said fluid suction means and direct it to said second pressure line, a control slide valve in said slide valve housing having two outer and two inner axially spaced piston portions arranged in sliding contact with the interior of said slide valve housing, means to bias said control slide valve into a neutral position with the outer two of said piston portions uncovering said first and second pressure lines and covering said return flow pipe lines and the inner two of said piston portions covering said first and second conduits and uncovering said drain-off lines, and means to direct said first fluid under pressure to the central portion of said slide valve housing at a location when said control slide valve is in a neutral position, between said inner piston portions, said control slide valve being displaceable by said second fluid upon rotation of said pump hand crank in one direction to displace said control slide valve and uncover said first conduit and communicate said first conduit with said fluid directing means for said first fluid and communicate said second conduit directly with said second drain-off line and communicate said second pressure line with said second return flow line, said control slide valve being displaceable by said second fluid in an opposite direction upon rotation of said pump crank in an opposite direction to displace said control slide valve to a position to uncover said second conduit and communicate said second conduit with said fluid directing means for said first fluid and communicate said first conduit directly with said first drain-off line and said first pressure line with said first return flow line.

6. A fluid actuated control for precisely displacing parts such as machine elements of a machine tool comprising at least one working cylinder, at least one working piston reciprocably arranged in said working cylinder, said working piston being operatively connected to said one machine element for displacement of the latter, separate conduit means in registry with opposite ends of said working cylinder, a slide valve arrangement including a slide valve housing and a control slide valve displaceable in said slide valve housing for distributing a first pressure medium via one of said conduit means to one end of said working cylinder, a feed line for said first pressure medium operably connected to said slide valve housing, means located in said slide valve housing engaging said control slide valve therein for maintaining the latter in a neutral position, at least one hand-operated pump located remote from said working cylinder and from said one machine element to be displaced, supply means for a second pressure medium, said pump being actuatable in opposite directions, respective pipe means for said second pressure medium connecting said pump with said slide valve housing and with said supply means so that upon actuation of said pump in one of said directions said control slide valve will be correspondingly displaced by said second pressure medium against the action of one of said engaging means to establish communication of said first pressure medium via said feed line and a respective one of said conduit means with one end of said working cylinder so as to cause displacement of said working piston in the latter and thus of said one machine element, said control slide valve separating said pipe means from direct communication with said conduit means at all times, to thereby provide separate flow circuits for said first and second pressure mediums, respectively, drain-lines for directly delivering to a reservoir said first pressure medium returned from said working cylinder, and respective return pipe lines, cooperating with said respective pipe means for said second pressure medium closed by said control slide valve in said neutral position of the latter, each of said respective return pipe lines being in fluid flow communication with its associated pipe means during such time as second pressure medium is flowing through said associated pipe means for displacing said control slide valve.

References Cited in the file of this patent

UNITED STATES PATENTS

| | | |
|---|---|---|
| 404,472 | Dunn | June 4, 1889 |
| 2,020,951 | Lemon | Nov. 12, 1935 |
| 2,185,277 | Stelzer | Jan. 2, 1940 |
| 2,214,817 | Harrington | Sept. 17, 1940 |
| 2,236,467 | Clench | Mar. 25, 1941 |
| 2,368,628 | Bates | Feb. 6, 1945 |
| 2,400,685 | Collins | May 21, 1946 |
| 2,512,979 | Strother | June 27, 1950 |
| 2,558,071 | Castle | June 26, 1951 |
| 2,637,303 | Cintron | May 5, 1953 |
| 2,675,652 | Chiappulini | Apr. 20, 1954 |
| 2,816,420 | Walsh | Dec. 19, 1957 |
| 2,825,307 | Enyeart et al. | Mar. 4, 1958 |
| 2,835,265 | Brandstadter | May 20, 1958 |